United States Patent [19]

Mizuno

[11] 4,399,468
[45] Aug. 16, 1983

[54] PRINTER

[75] Inventor: Sakuyuki Mizuno, Kunitachi, Japan

[73] Assignee: Tokyo Shibaura Denki Kabushiki Kaisha, Kawasaki, Japan

[21] Appl. No.: 274,796

[22] Filed: Jun. 18, 1981

[30] Foreign Application Priority Data

Jun. 25, 1980 [JP] Japan .................................. 55-86211

[51] Int. Cl.³ .............................................. H04N 1/40
[52] U.S. Cl. ................................... 358/280; 358/284; 358/296; 358/282
[58] Field of Search ............... 358/280, 282, 283, 138, 358/284, 166, 96, 296, 264, 266; 340/141.3 AG; 328/135, 147

[56] References Cited

U.S. PATENT DOCUMENTS 4,237,495 12/1980 Yamamoto .......................... 358/262

Primary Examiner—Robert L. Griffin
Assistant Examiner—Edward L. Coles
Attorney, Agent, or Firm—Cushman, Darby & Cushman

[57] ABSTRACT

A sampled input video signal is supplied to first and second comparators respectively having high and low reference levels, and the outputs of the first and second comparators are checked with each other in synchronism to the timing of the sampling. If the outputs of the first and second comparators are both detected, a thick black dot is printed. If only the output of the second comparator is detected, the pulse duration of a drive pulse output supplied to a printing head is reduced, so that a thin gray dot is printed.

11 Claims, 6 Drawing Figures

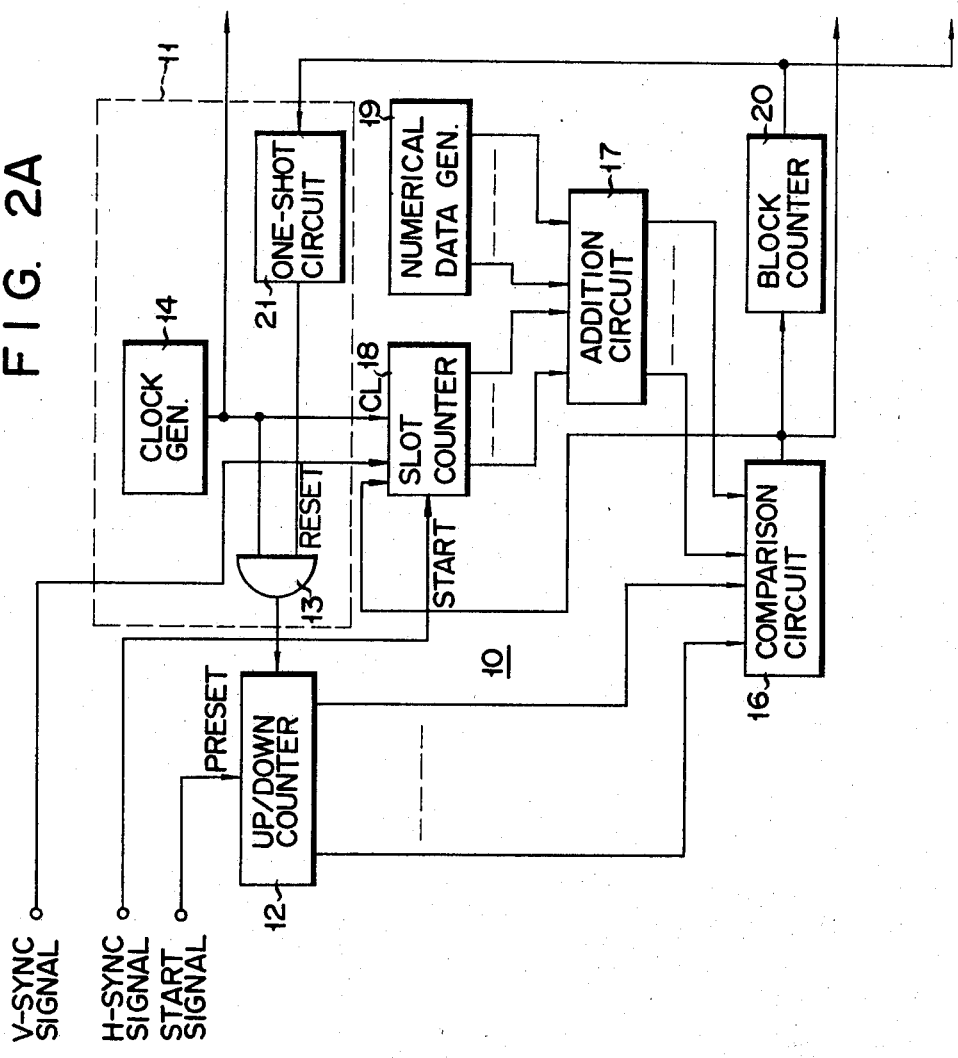

FIG. 4
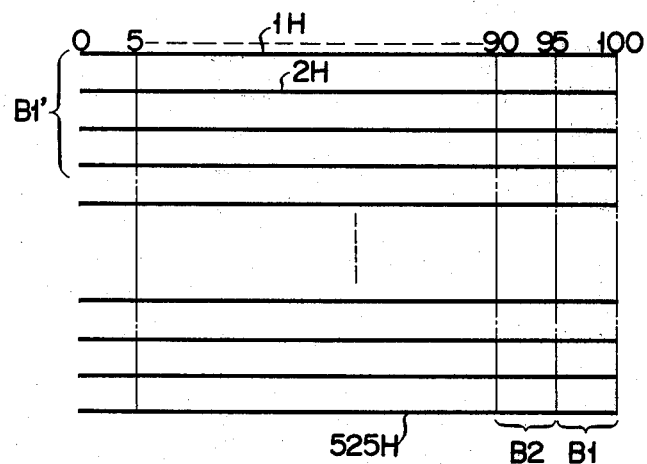
FIG. 5
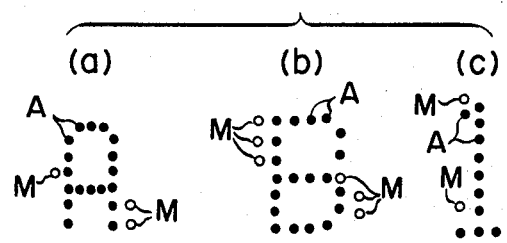
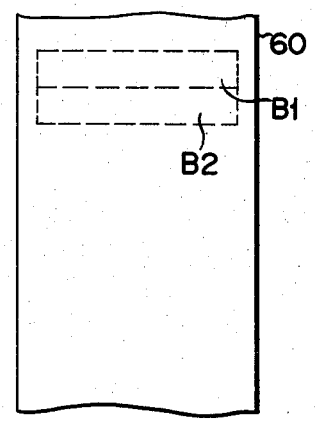
FIG. 6

PRINTER

BACKGROUND OF THE INVENTION

This invention relates to printers, with which a dotted print of the data displayed on, for instance, a CRT display according to a video signal is obtained on a printing sheet.

A discharge printer using electric discharge such as spark discharge, for instance, has been used for printing given characters and figures as a dotted print on a printing sheet according to a video signal. In this discharge printer, the input video signal is sampled according to a sampling signal obtained from a phase locked loop (PLL), and the sampled video signal is used to cause spark discharge so as to decompose an aluminum film of an aluminum-deposited printing sheet, thus forming a dot. A dotted print of given characters or figures is obtained as corresponding combinations of dots thus formed.

With this kind of printer, however, the video signal portions corresponding to dots randomly appear and are not synchronized to a sampling signal which has a predetermined frequency. Therefore, it is likely that the rising or falling end of a portion corresponding to a dot is sampled and that the level of the sampled output becomes higher or lower than a threshold level which is a reference level of printing. Particularly, it has hitherto been the case that a black dot is printed even if the sampled output level is higher than the threshold level only slightly. In this case, the form of the printed characters or figures is inaccurate and is prone to misreading. Shown in (a), (b) and (c) in FIG. 1 are printed characters "A", "B" and "1" obtained with a conventional discharge printer. Here, labeled M are misprinted dots.

As is shown, with the prior art printer the misprinted dots have the same tone as the regular dots constituting the printed characters "A", "B" and "1", and therefore the printed characters have inaccurate contours and are sometimes liable to be read as different characters. This has been known as a grave drawback of the prior art discharge printer of this kind.

SUMMARY OF THE INVENTION

An object of the invention, accordingly, is to provide a printer, with which given characters or figures can be printed practically in a clear and accurate form not deteriorated even in case when misprint portions are contained.

According to the invention, the above object is achieved by constructing a printer such that gray dots thinner than the regular black dot are printed for video signals at intermediate levels between a first low threshold level and a second high threshold level.

BRIEF DESCRIPTION OF THE DRAWINGS

FIG. 2A and FIG. 2B are schematic representation of the circuit construction of one embodiment of the printer according to the invention;

FIG. 4 is a view showing the printing position of one block formed on a printing sheet with the printer of FIG. 4;

FIG. 5 is a view showing an example of the dotted print obtained with the printer shown in FIGS. 2A and 2B; and FIG. 6 is a view showing a printing sheet with a block printed thereon.

DETAILED DESCRIPTION OF THE PREFERRED EMBODIMENT

Figure 2B:
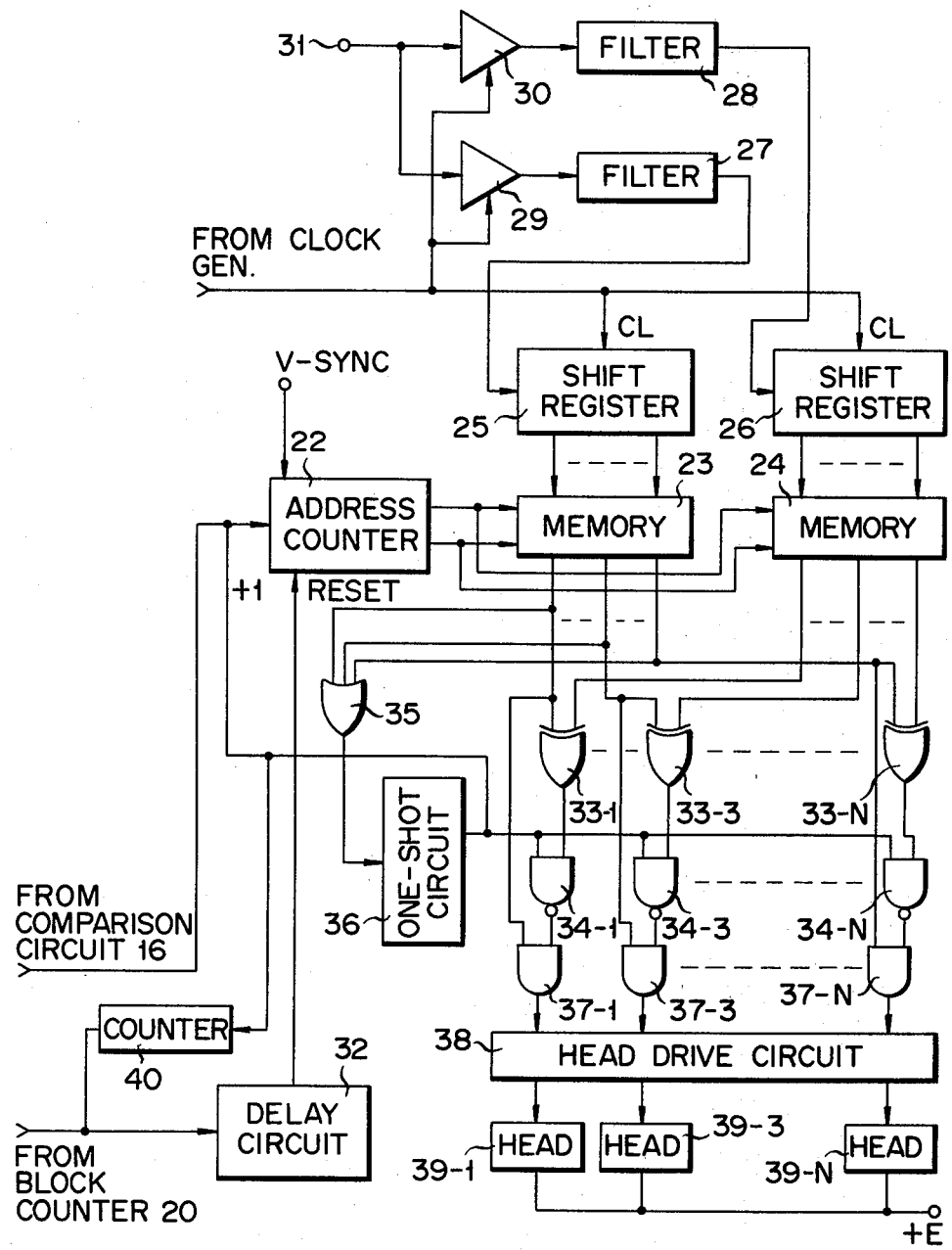

Now, an embodiment of the invention will be described in detail with reference to FIGS. 2A and 2B and following Figures. Referring now to FIGS. 2A and 2B, an input television signal is supplied to a CRT display (not shown), and figures, drawings, etc. represented by the input television signal are displayed on the screen of the CRT display. In this display, the vertical and horizontal sync signals and also the input video signal are separated from the input television signal. Of these separated signals, the vertical and horizontal signals are led to a print synchronization circuit section 10. Prior to the vertical and horizontal sync signals, a start signal is also supplied from the CRT display to the circuit section 10. This start signal is used as preset and clear signals for initializing the individual circuits in this embodiment.

The start signal is supplied to a preset input terminal of an up/down counter 12 which serves as a reference value setting circuit. When the start signal is supplied to the counter 12, its content is preset to "105". Designated at 11 is a timing circuit, which includes an AND circuit 13 having the output terminal thereof connected to a down-count input terminal of the counter 12. A clock signal from a clock signal generator 14 is supplied to one input terminal of the AND circuit 13. A gate control signal from a one-shot circuit 21 to be described later in detail is supplied to the other input terminal of the AND gate 13.

The output side of the counter 12 is connected to one reference value input terminal of a comparator 16, and the output side of an addition circuit 17 is connected to the other input terminal of the comparator 16. The outputs from a slot counter 18 and a numerical data generator 19 are supplied to the addition circuit 17, and their values are added together there. The slot counter 18 has a start terminal, to which the horizontal sync signal from the CRT display is supplied, a clock input terminal CL, to which the clock signal from the clock signal generator 14 is supplied, and reset terminals, to which the vertical sync signal and a coincidence signal of the comparator 16 are respectively supplied. The numerical data generator 19 is preset such that it always provides a digital signal representing a numerical value "5".

When the outputs of the counter 12 and addition circuit 17 coincide, a coincidence output is provided from the comparison circuit 16 to the reset terminal of the slot counter 18 and also to the input terminal of the block counter 20. The block counter 20 is, for instance, 525-step counter, which provides a carry signal and is restored to zero when it counts 525 horizontal sync signals corresponding to 525 scanning lines on the screen of the CRT display. The carry signal of the counter 20 is supplied to the one-shot circuit 21, and upon receipt of this carry signal the one-shot circuit 21 provides a pulse signal having a predetermined duration as a gate control signal to the AND circuit 13. The duration of the pulse signal is set such that during its period five output clock pulses from the clock generator 14 are passed through the AND circuit 13 and supplied to the down-count terminal of the counter 12.

The coincidence output of the comparison circuit 16 is supplied to an input terminal of an address counter 22. The output address signal from the address counter 22 is supplied to an address input terminal of each of two memories 23 and 24. The contents of shift registers 25 and 26 are simultaneously shifted as plural bit signals to the respective memories 23 and 24. The clock signal from the clock generator 14 is supplied as a shift signal to a clock input terminal of each of the shift registers 25 and 26.

The outputs of comparators 29 and 30 are coupled through filters 27 and 28 to the input terminals of the respective shift registers 25 and 26. The comparators 29 and 30 are individually constituted by, for instance, operational amplifiers, which have different reference levels for comparison and are capable of internally setting the comparison values. The input terminals of the comparators 29 and 30 are connected to a video signal input terminal 31 to which the video signal is supplied from the CRT display.

The output of the block counter 20 is delayed by a delay circuit 32 for a predetermined period of time. This delay period is set to a period which is required for the restorage of the video signal of the last horizontal scanning line at least on one block from the shift registers 25 and 26 in the memories 23 and 24 by the action of the address counter 22 in accordance with the coincidence output of the comparison circuit 16. The output of the delay circuit 32 is supplied to the reset terminal of the address counter 22. As a result, the content of the address counter 22 is reset to zero, and the contents stored in the zero address locations of the memories 23 and 24 are read out by the address counter 22. The video signals read out from the memories 23 and 24 are combined for the individual bits and are supplied to input terminals of exclusive OR circuits 33-1 to 33-N. The output terminals of the exclusive OR circuits 33-1 to 33-N are each connected to one input terminal of corresponding one of NAND circuits 34-1 to 34-N.

The output of the memory 34 is coupled to the input terminals of an OR circuit 35, and the output therefrom is coupled to an input terminal of a one-shot circuit 36. The output of the memory 23 corresponds to the output of the one-shot circuit 36 and is in the form of a pulse having a predetermined short duration. The output pulse of the one-shot circuit 36 is coupled to the other input terminal of each of the NAND circuits 34-1 to 34-N.

The outputs of the NAND circuits 34-1 to 34-N and the outputs of the memory 23 are coupled to the input terminals of the AND circuits 37-1 to 37-N. The outputs of the AND circuits 37-1 to 37-N are coupled to respective input terminals of a head drive circuit 38, whereby discharge of a predetermined intensity is caused in heads 39-1 to 39-N connected to the circuit 38 with respect to a supply voltage +E to effect the printing of predetermined dots on a printing sheet.

When a video signal is read out from the first address location of the memories 23 and 24 and printed, "+1" is added to the address counter 22, and as a result access is made to the next address of the memories 23 and 24 for reading out and printing the data stored in the location of that address. As the "+1" signal, the output of the one-shot circuit 36 shown in FIG. 2B is supplied to the address counter 22. The output of the one-shot circuit 36 is also supplied to a counter 40, for which the same number as the number of addresses of the memories 23 and 24 is set. When the data in the last address of the memories 23 and 24 is read out, a carry signal is provided from the counter 40 and coupled through the delay circuit 32 as a reset signal to the reset terminal of the address counter 22.

Now, the operation of the construction of the embodiment of FIGS. 2A and 2B will be described with reference to FIGS. 3 to 6.

Figure 1:
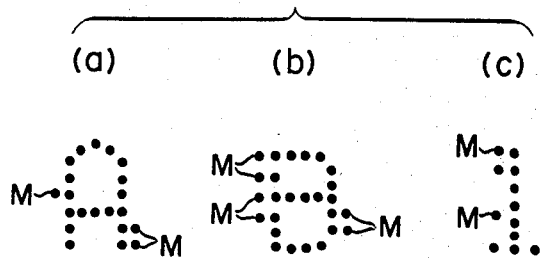
FIG. 1 is a view showing an example of the dotted print obtained with a prior art discharge printer.
Figure 3:
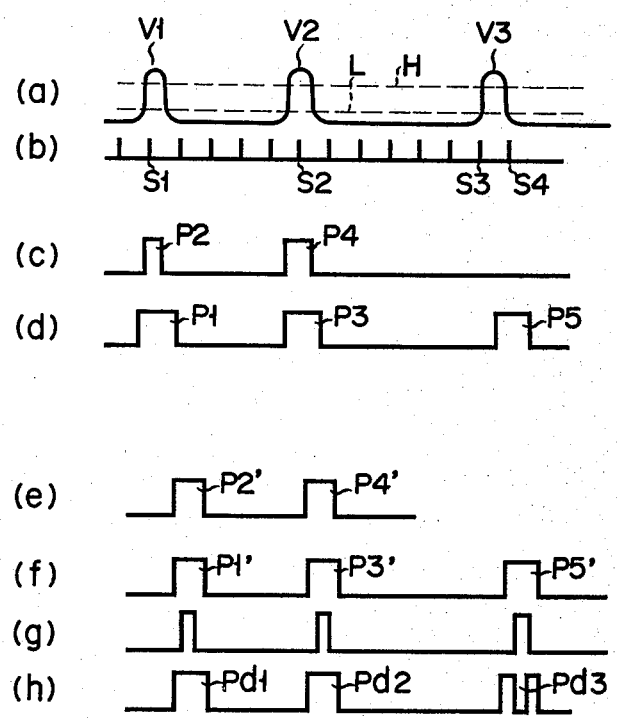
FIG. 3 is a time chart showing signals for illustrating the operation of the printer of FIGS. 2A and 2B.

A video signal as shown in (a) in FIG. 3 is supplied from the CRT display to the video signal input terminal 31. The reference level of the comparator 29, to which the video signal is supplied, is as shown by a dashed line L in (a) in FIG. 3, and the reference level of the comparator 30 is as shown by a dashed line H in (a) in FIG. 3. The clock signal as shown in (b) in FIG. 3 is supplied as a sampling signal from the clock generator 14 to the comparators 29 and 30. The high-pass filters 27 and 28, which remove noise components in the outputs of the comparators 29 and 30, provide outputs as shown in (d) and (c) in FIG. 3, which are coupled to the respective shift registers 25 and 26. Since the sampling signal S1 is provided substantially at the center of the video signal V1, the outputs of the comparators 29 and 30 are pulses P1 and P2 as shown in (d) and (c) in FIG. 3. With respect to the video signal V2, the sampling signal S2 is provided substantially at the center of its period, and the outputs of the comparators 29 and 30 are thus provided as respective pulses P3 and P4. With respect to the video signal V3, however, the sampling signals S3 and S4 are not provided in the video signal V3 which is sliced with respect to the level H, so that no output corresponding to the video signal V3 appears at the output terminal of the comparator 30. On the other hand, the sampling signals S3 and S4 are provided during the video signal V3 sliced with respect to the level L, and thus a pulse P5 as shown in (d) in FIG. 3 is provided from the output terminal of the comparator 29.

The pulse signals shown in (d) and (c) in FIG. 3, obtained from the output terminals of the comparators 29 and 30 are successively stored in the shift registers 25 and 26 according to the clock signal from the clock generator 14. The capacity of the shift registers 25 and 26 is such that a video signal for 5 slots, with 100 slots corresponding to one horizontal scanning line 1H shown in FIG. 4, is stored as unit slot data.

Meanwhile, the content of the up/down counter 12 is preset to "105" in response to the start signal supplied from the CRT display, and the content of the slot counter 18 is reset in response to the subsequently supplied first vertical sync signal. The content "105" of the counter 12 is supplied to one of the input terminals of the comparison circuit 16. When the first horizontal sync signal is supplied to the start terminal of the slot counter 18 in this state, the slot counter 18 starts to count the clock signal from the clock generator 14. The clock signal is set such that its 100 cycles just correspond to one horizontal scanning line (1H) as shown in FIG. 4. Thus, when the content of the slot counter 18 reaches "100", the video signal for five slots, namely the 96-th to 100-th slots, of the first horizontal scanning line (1H) is stored in the two shift registers 25 and 26. At this time, the content "100" of the slot counter 18 and the output numerical value "5" of the numerical data generator 19 are added together in the addition circuit 17, and the result "105" is coupled to the other input terminal of the comparison circuit 16, causing the comparison circuit 16 to provide a coincidence signal. With this coincidence signal, the slot counter 18, is reset, thus changing the content of the block counter 20 to "1" and also the content of the address counter 22 to "1". As a result, an address signal is supplied from the address counter 22 to the memories 23 and 24, and the video signal for the 96-th to 100-th slots having been stored in the shift registers 25 and 26 is stored in the first address.

When the next horizontal sync signal is supplied to the start terminal of the slot counter 18, the slot counter similarly counts 100 clock signal pulses, and at the end of this counting a coincidence signal is provided from the comparison circuit 16. As a result, the slot counter 18 is reset again, changing the content of the block counter 20 to "2" and also the content of the address counter 22 to "2". At this time, the unit slot data for the 96-th to 100-th unit slots of the second horizontal scanning line (2H), which have been stored in the shift registers 25 and 26, are stored in the second address location of the memories 23 and 24.

In the above way, the unit slot data for the 96-th to 100-th slots for the first to last horizontal scanning lines (1H) to (525H) as shown in FIG. 4 are all stored in the memories 23 and 24. The data stored in the memories 23 and 24 in this way, is referred to as one block (B1) data.

When the 525-th coincidence signal is supplied from the comparison circuit 16 to the block counter 20, a carry signal is provided from the counter 20 to the one-shot circuit 21 and delay circuit 32. As a result, a single pulse having a predetermined duration is provided from the one-shot circuit 21 to enable the AND circuit 13, whereby five clock pulses from the clock generator 14 are coupled through the AND circuit 13 to the down-count terminal of the up/down counter 12, thus reducing the preset value of the counter 12 by "5" to "100".

Meanwhile, after the slot data for the 96-th to 100-th unit slots of the 525-th horizontal scanning line 525H have been stored in the shift registers 25 and 26 according to the 525-th coincidence signal provided from the comparison circuit 16, a reset signal is supplied from the delay circuit 32 to the address counter 22, thus resetting the counter 22. Thereafter, the counter 22 is set to "1" in response to a predetermined read-out instruction signal, whereby the first unit slot data in the memories 23 and 24 are read out with the addresses thereof made access to according to the address signal from the address counter 22. The video signal read out from the memory 24 at this time, has a waveform as shown in (e) in FIG. 3, and the video signal read out from the memory 23 has a waveform as shown in (f) in FIG. 3. For the sake of the simplicity of the description, the output signals of the memories 23 and 24 are shown as P1' to P5' in correspondence to the pulses shown in (c) and (d) in FIG. 3.

It is now assumed that the pulses P1' and P2' as shown in (e) and (f) in FIG. 3 for the video signal in the 96-th slot group of the horizontal scanning line 1H shown in FIG. 4 are read out from the memories 23 and 24 and supplied to the exclusive OR circuit 33-1. At this time, both the inputs to the exclusive OR circuit 33-1 are "1", and thus a signal of "0" appears at the output terminal of the exclusive OR circuit 33-1 and is supplied to one input of the NAND circuit 34-1. The one-shot circuit 36, which is driven by the output of the OR circuit 35, provides a pulse having a short duration as shown in (g) in FIG. 3, which is coupled to the other input terminal of the NAND circuit 34-1. While the NAND circuit 34-1 provides output "1" for the short duration pulse output of the one-shot circuit 36, since the output of the exclusive OR circuit 33-1 is "0" during the presence of the pulses P1' and P2', it provides output "1" not only during the short pulse period shown in (g) in FIG. 3 but during the presence of both the pulses P1' and P2'. The long duration pulse "1" of the NAND circuit 34-1 is coupled to one input terminal of the AND circuit 37-1. Since the AND circuit 37-1 is receiving at its other input terminal the long duration pulse from the memory 23, the head 39-1 is energized through the head drive circuit 38 for a comparatively long period by a long duration pulse Pd1 as shown in (h) in FIG. 3, and thus a thick black dot is printed on a printing sheet due to an intense spark discharge.

With respect to the pulses P3' and P4' for the 97-th slot group, like the previous case of the pulses P1' and P2', a long duration head drive pulses Pd2 is obtained, so that a thick black dot is printed, as is obvious from (e) to (h) in FIG. 3.

For the 98-th slot group, only the pulse P5' as shown in (f) in FIG. 3 is read out from the memory 23, and no pulse is read out from the memory 24. Thus, outputs "1" and "0" are coupled to the input terminals of the exclusive OR circuit 33-3, which thus provides output "1". Consequently, the NAND circuit 34-3 provides output, which is "0" only during the presence of the short duration pulse from the one-shot circuit 36 and "1" for the rest of the output "1" of the exclusive OR circuit 33-3. This means that the AND circuit 37-3 provides as its output Pd3 two successive short duration pulses spaced apart by the period corresponding to the short duration pulse from the one-shot circuit 36, as shown in (h) in FIG. 3. With the head 39-3 energized by this output Pd3, a thin black dot, i.e., gray dot, is printed for the 97-th slot group.

while in the above description it is shown that only a single dot is printed for one slot, in practice seven dots at the most, for instance, may be printed for one slot. Shown in (a), (b) and (c) in FIG. 5 are the prints of characters "A", "B" and "1" obtained in the manner as described. Here, the thick black dots which are printed by the normal drive pulse such as those Pd1 and Pd2 shown in (h) in FIG. 3 are labeled A, while the gray dots printed by two successive short duration pulses such as the drive pulse output Pd3 are labeled M. It will be understood that there is a clear contrast between the dots A and M, so that the characters "A", "B" and "1" can be clearly identified as such by the eyes. FIG. 6 shows a printing sheet, on which all the video data for one block B1, read out from the memories 23 and 24, are printed. Here, a block print corresponding to the block B1 shown in FIG. 4 is formed in a position of the printing sheet 60 as shown by broken lines B1.

The period, during which the video signal of the block B1 read out from the memories 23 and 24 is printed on the printing sheet 60, corresponds to the period from the appearance of the last horizontal scanning line 525H till the appearance of second vertical sync signal, i.e., the vertical blanking period.

When the second vertical sync signal appears, the slot counter 18 is reset. When the first horizontal sync signal is coupled to the start terminal of the slot counter 18 in this state, the slot counter 18 starts to count the clock signal. Since at this time the content of the up/down counter 12 is set to "100", when the count of the slot counter 18 becomes "95", the comparison circuit 16 provides a coincidence signal. As a result, the unit slot data for the 91-st to 95-th slots of the first horizontal scanning line shown in FIG. 4 are stored in the first address location of the memories 23 and 24. In this way, the video data for the 91-st to 95-th slots of the first to last horizontal scanning lines (1H) to (525H) are stored in the memories 23 and 24 as the second block data B2 and printed on the printing sheet 60 as block B2 below the block B1. At this time, five clock signals are coupled through the AND gate 13 to the down-count terminal of the up/down counter 12 under the control of a carry signal from the block counter 20, whereby the content of the counter 12 is set this time to "100"—"5"="95".

In the above way, characters are printed on the printing sheet 60 for one block after another.

while in the above embodiment one horizontal scanning line is divided into 100 slots and the video signal is stored in the memories, read out and printed for one block after another, with each block constituted by the slot groups each of five slots in the individual horizontal scanning lines, it is also possible to permit the video signal to be stored in the memories and then read out therefrom and printed on the printing sheet for one block after another, with each block constituted by, for instance, four horizontal scanning lines such as the block labeled B1' in FIG. 4.

Further, while in the above embodiment the total pulse duration of the output supplied to the printing head is reduced for printing thinner slots as presumably erroneous dots with respect to the normal dots, it is possible to very not the duration of the drive pulse supplied to the head but the level of the pulse so as to reduce the electric energy supplied to the head for printing a thinner dot.

What is claimed is:

1. Apparatus for printing data contained in an input video signal asynchronously of said input video signal comprising:
    means for generating a sampling clock signal independently of said input video signal;
    means for sampling said input video signal with said sampling clock signal;
    first comparator means for providing a first pulse output when the level of the sampled input video signal is higher than a first reference level;
    second comparator means for providing a second pulse output when the level of the sampled input video signal is higher than a second reference level which is lower than the first reference level;
    means for separately memorizing the pulse outputs of said first and second comparator means;
    means for reading out said first and second comparator means pulse outputs stored separately in said memorizing means and checking them with each other for each sampling; and
    means for printing a regular thick black dot when said first and second comparator means pulse outputs are detected as a result of the checking and printing a thin gray dot when only the second comparator means pulse output is detected on a printing sheet.

2. Apparatus according to claim 1, wherein said memorizing means includes a first shift register for successively storing said first comparator means pulse output, a second shift register for successively storing said second comparator means pulse output, first and second memories for storing said respective first and second comparator means pulse outputs stored in said first and second registers, and write control means for controlling the writing of said first and second comparator means pulse outputs stored in said first and second shift registers into said first and second memories.

3. Apparatus according to claim 2, wherein said write control means includes a printing synchronizing circuit section for providing a write signal for every slot group consisting of a predetermined number of slots in the horizontal scanning direction of a CRT display screen, and an address counter specifying the address of said memories according to said write signal.

4. Apparatus according to claim 3, wherein said printing synchronization circuit section includes an up/down counter with a predetermined numerical value preset therein, a slot counter for counting clock signal pulses corresponding to respective slots on the horizontal scanning line, a numerical value generator for always providing a predetermined numerical value signal, an addition circuit for adding the outputs of said slot counter and numerical value generator, a comparator circuit for comparing the output of said addition circuit and up/down counter, a block counter for counting coincidence outputs of said comparator circuit, means for supplying said coincidence output as said write signal to said address counter, and means for supplying a carry signal from said block counter as a reset signal to said address counter.

5. Apparatus according to claim 3, wherein said checking means each includes a plurality of exclusive OR gates having first and second input terminals to which the outputs of said first and second memories are coupled, a plurality of NAND circuits each having one input terminal to which the output of the corresponding one of said exclusive OR gates is coupled, means for supplying a first gate signal having a predetermined short duration to the other input terminal of each of said plurality of NAND circuits, a plurality of AND circuits each having one input terminal to which the output of the corresponding one of said NAND circuits is coupled, means for supplying a second gate signal having a predetermined long duration to the other input terminal of each of said plurality of AND circuits, and means for coupling the outputs of said plurality of AND circuits to said printing means.

6. Apparatus according to claim 5, wherein said means for supplying said second gate signal having a long duration includes an OR circuit having a plurality of input terminals to which the output of said second memory is coupled, and also wherein said means for supplying said first gate signal having a short duration includes a one-shot circuit to which the output of said OR circuit is coupled.

7. Apparatus according to claaim 1, which further comprises first and second high-pass filters respectively connected between the output side of said first and second comparator means and input side of said memorizing means.

8. A printer comprising:
    means for sampling an input video signal;
    first comparator means for providing a first pulse output when the level of the sampled input video signal is higher than a first reference level;
    second comparator means for providing a second pulse output when the level of the sampled input video signal is higher than a second reference level which is lower than the first reference level;
    a first shift register for successively storing said first comparator means pulse output;
    a second shift register for successively storing said second comparator means pulse output;

first and second memories for storing said respective first and second comparator means pulse outputs stored in said first and second registers;

write control means for controlling the writing of said first and second comparator means pulse outputs stored in said first and second shift registers into said first and second memories, said write control means including a printing synchronizing circuit section for providing a write signal for every slot group consisting of a predetermined number of slots in the horizontal scanning direction of a CRT display screen, and an address counter specifying the address of said memories according to said write signal; and means for reading out said first and second comparator means pulse outputs stored in said first and second memories and checking them with each other for each sampling; and means for printing a regular thick black dot when said first and second comparator means pulse outputs are detected as a result of the checking and printing a thin gray dot when only the second comparator means pulse output is detected on a printing sheet.

9. A printer according to claim 8, wherein said printing synchronization circuit section includes;

an up/down counter with a predetermined numerical value preset therein;

a slot counter for counting clock signal pulses corresponding to respective slots on the horizontal scanning line;

a numerical value generator for always providing a predetermined numerical value signal;

an addition circuit for adding the outputs of said slot counter and numerical value generator;

a comparator circuit for comparing the output of said addition circuit and up/down counter;

a block counter for counting coincidence outputs of said comparator circuit;

means for supplying said coincidence output as said write signal to said address counter; and means for supplying a carry signal from said block counter as a reset signal to said address counter.

10. A printer according to claim 8, wherein said checking means each includes;

a plurality of exclusive OR gates having first and second input terminals to which the outputs of said first and second memories are coupled;

a plurality of NAND circuits each having one input terminal to which the output of the corresponding one of said exclusive OR gates is coupled;

means for supplying a first gate signal having a predetermined short duration to the other input terminal of each of said plurality of NAND circuits;

a plurality of AND circuits each having one input terminal to which the output of the corresponding one of said NAND circuits is coupled;

means for supplying a second gate signal having a predetermined long duration to the other input terminal of each of said plurality of AND circuits; and means for coupling the outputs of said plurality of AND circuits to said printing means.

11. A printer according to claim 10, wherein:

said means for supplying said second gate signal having a long duration includes an OR circuit having a plurality of input terminals to which the output of said second memory is coupled; and said means for supplying said first gate signal having a short duration includes a one-shot circuit to which the output of said OR circuit is coupled.

* * * * *